United States Patent [19]

Pretto

[11] 4,027,533

[45] June 7, 1977

[54] ANGLE OF ATTACK INDICATING DEVICE

[76] Inventor: John Pretto, 624 S. Belmont, Arlington Heights, Ill. 60005

[22] Filed: June 23, 1976

[21] Appl. No.: 698,840

[52] U.S. Cl. .................................. 73/188; 73/180; 114/102

[51] Int. Cl.[2] .................. C01W 1/00; B63H 9/04

[58] Field of Search ............... 73/178 R, 180, 188, 73/189; 114/102, 103

[56] References Cited

UNITED STATES PATENTS

| 2,681,569 | 6/1954 | Hirschoff | 73/188 |
|---|---|---|---|
| 3,371,529 | 3/1968 | Tillman | 73/188 |

Primary Examiner—Richard C. Queisser
Assistant Examiner—John S. Appleman
Attorney, Agent, or Firm—Robert J. Black

[57] ABSTRACT

An angle of attack indicating device for use in indicating the sail trim of a sail boat or the angle of attack of an airfoil in order that the sail or the airfoil may be optimized. The device of the present invention employs wind operated sensing vanes coupled to associated indicator vanes mounted on either side of the leading edge of an airfoil such as a sail or wing, which are employed to sense the airflow differential on the opposite sides of the airfoil. By visual indication of the relative positions of the wind responsive vane and the indicating vane appropriate adjustment may be made to maintain the proper attack angle.

10 Claims, 4 Drawing Figures

ANGLE OF ATTACK INDICATING DEVICE

BACKGROUND OF THE INVENTION

1. Field of the Invention

This invention relates to indicator devices and more particularly to a device for indicating the relative velocity of air passing over either side of an air foil.

2. Description of the Prior Art

Adjusting the sails on a modern sailboat to obtain maximum forward hull speed for the boat involves taking into consideration a large number of interrelated variables, many of which are constantly subject to change as the sailboat is underway. The principal significance in sailing is the requirement that the trim of the sail be maintained at an optimum attack angle with respect to the wind.

Experienced sailors for many years have been using yarn or tape telltails located on both sides of their headsail to give an indication of sail trim. When sailing in good trim both telltails stream back parallel to the sail, following the smooth flow of air over both sides of the sail. When the jib or foresail is trimmed too tight or one is sailing too low the leeward telltail will flutter indicating that the sail is stalling. Conversely if one is too high the weather telltail will flutter indicating the sail is approaching a luff. In such a system of course it is sometimes difficult for the sailor to view both telltails and accurately judge their relative position to thus insure proper sail set.

One scheme developed to provide a more efficient means of determining the set of the sail and proper angle of attack is that disclosed in U.S. Pat. No. 3,654,807 wherein temperature sensitive devices are mounted on either side of the sail nearest the leading edge and by means of electronic instrumentation, flashing lamps or similar indicators, provide an indication of the relative laminar air flow over either side of the airfoil whereby corrections may be made to the angle of attack. Such a system obviously is expensive to both manufacture and maintain and its use may be more complicated than is desirable to many sailors.

Accordingly it is the object of the present invention to provide a new angle of attack indicating device that overcomes the objections outlined above to such simplified angle of attack indicators as telltails, yet is economic to manufacture and maintain and as simple in its mode of operation.

SUMMARY OF THE INVENTION

The device of the present invention is designed to maximize air foil or sail trim on vehicles utilizing air flow for lift or propulsion. This air foil trim sensing technique can be used on any device using the airfoil principle to develop a propelling force, i.e., sail boats, ice boats, land sail vehicles, windmills, airplane wings, etc., i.e., on any air vehicle which uses the air flow differential between one side and the other to develop a thrust. The principle being that maximum lift is achieved when the air velocity and direction are equal on each side of the extreme leading edge of the air foil. The consequent geometry after the leading edge develops the force, but, if the airfoil is adjusted either by the tension or angular position to the wind such that the air flow at the leading edge is balanced, maximum force will be developed.

Sensing is accomplished by vanes, positioned at the leading edge of the airfoil. The display is of a geometric nature such that the vanes are parallel to each other. Two sets of vanes are employed on either side of the sail. In each case the dominant vane would be on one side of the sail with a servile vane rigidly affixed to the first and positioned on the opposite side of the sail. A second set of vanes (dominant and servile) rigidly fastened would be included. A coaxial bearing arrangement is used to position all four vanes on the same center of rotation. This device allows the operator to sense wind direction and position from either side of the sail, facilitating convenient view of the device from either a starboard or port tack.

DESCRIPTION OF THE PREFERRED EMBODIMENT

Figure 1:
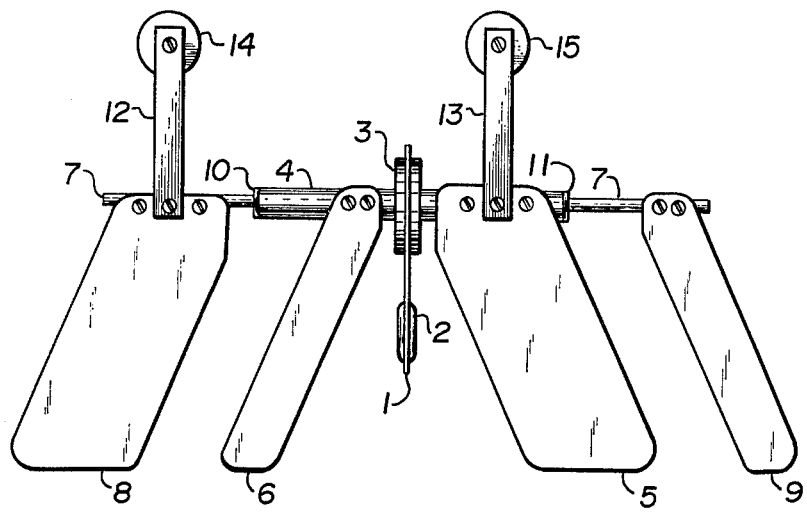
FIG. 1 is a top view of the angle of attack indicating device of the present invention.
Figure 2:
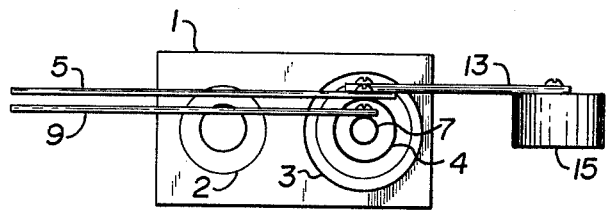
FIG. 2 is a right side view of the angle of attack indicating device of the present invention.
Figure 3:
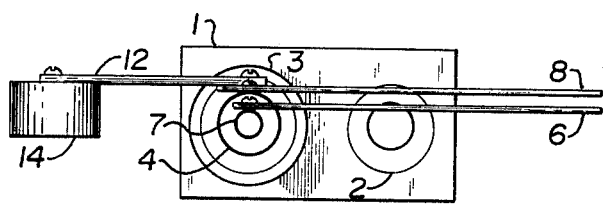
FIG. 3 is a left side view of the angle of attack indicating device of the present invention.

Referring now to FIGS. 1, 2 and 3 the angle of attack indicating device of the present invention includes a support means for the present device which may include a grommet 2 for affixing the device of the present invention to the leading edge of the jib or foresail of a sailboat. Included in the support may be a grommet 2 or a similar device for use in affixing the support to the leading edge of the sail. Fastened to the mounting unit nearest the leading edge in that direction projecting away from the sail to which it is affixed, is a bearing 3. Bearing 3 includes concentrically mounted therein a rotatable hollow shaft or outer axle 4 which in turn has concentrically mounted therein along the same axis, a second rotatable shaft or inner axle 7. Retaining devices 10 and 11 maintain inner axle 7 laterally inside of outer axle 4. Shaft 7 is thus co-axially mounted within hollow shaft 4 which in turn is co-axially mounted in bearing 3 which is supported by the mounting bracket 1.

Affixed to hollow shaft 4, the outer axle, is a sensing vane 5 and an indicating or slave vane 6. By reference to FIGS. 2 and 3 it will be seen that vanes 5 and 6 lie in the same plane. To counter balance the entire assembly consisting of outer axle 4 and vanes 5 and 6 a counter balance 15 is attached to vane 5 by means of a counter balance support 13.

The inner axle, shaft 7, has mounted thereon a sensing vane 8 and at the opposite end an indicating or slave vane 9. The assembly consisting of shaft 7 and vanes 8 and 9 is balanced by means of counter balance 14 which is affixed to vane 8 by counter balance support 12. In FIGS. 2 and 3 to avoid confusion the retainers 10 and 11 have not been shown.

Figure 4:
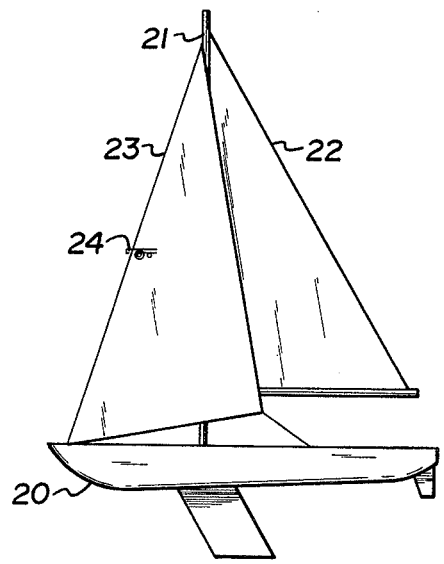
FIG. 4 is a representation of a sailboat showing the manner in which the angle of attack indicating device of the present invention is mounted on opposite sides of the jib sail, adjacent to its leading edge.

As shown in FIG. 4 the angle of attack indicating device 24 of the present invention, is mounted on the leading edge of the jib sail 23 of sailboat 20. By reference to the above figures it will be obvious that when the right or starboard side of the sail is visible to the sailboat operator, sensing vane 5 and slave vane 9 will be visible. Conversely when the port or left side of the jib sail is visible sensing vane 8 and slave vane 6 will be visible.

In the present embodiment of the invention the component parts thereof have been constructed of aluminum or similar lightweight metals, the vanes 5, 6, 8 and 9 being affixed to their associated shafts 4 and 7 respectively by means of small metal screws or rivets. Alternately other forms of construction may be employed utilizing either metal, plastic or any lightweight materials for ease of manufacture and maintenance. The particular materials employed form no portion of the present invention.

Operation of the angle of attack indicating device of the present invention will be obvious by reference to the following description. Assuming that the sailboat is underway and the jib or foresail is positioned so that the starboard or right side of the sail is visible, vanes 5 and 9 on the right side of the angle of attack indicating device will be visible. If the air velocity and direction is equal on each side of the leading edge of the sail, indicating vane 9 will be parallel to vane 5. If, however, the air flow is different on the port or left side of the sail from that flowing over the right or starboard side, because of the different position of sensing vane 8 on the port side, vane 9 will also have a different position relative to vane 5 and will not be parallel thereto. Accordingly the sail is then adjusted till the laminar flow of air over both sides of the sail are equal which will cause vanes 5 and 9 to then become parallel.

Conversely if the left or port side of the sail is visible, vane 8 and vane 6 will be visible and provide similar indications of equal or unequal flow of air over both sides of the sail. When the sail is properly adjusted so that it is equal on either side of the leading edge of the sail, maximum lift or motion will be achieved and maximum force will be developed.

While not shown in the drawing the effective size of the indicating vanes 6 and 9 may be increased, but their overall air resistance reduced by means of perforations or slots so that they present little or no impedance to the air flow on their respective sides of the sail.

While the present application has been designed for use with airfoils and particularly the sail of a sailing vessel, it will be apparent that the structure and concepts here disclosed are equally applicable to other forms of fluid foil including hydrofoils.

It will be obvious to those skilled in the art that numerous other modifications may be made without departing from the spirit of the present invention, which shall be limited only by the scope of the claims appended hereto.

What is claimed is:

1. Apparatus for indicating the optimum attack angle for a moving fluid foil with respect to the fluid through which the foil is moving, said apparatus comprising: a first rotatable shaft connected to and positioned perpendicular to said foil; first sensing means connected to said first shaft and positioned adjacent to a first side of said foil; first indicating means connected to said first shaft and positioned adjacent to a second side of said foil; said first sensing means and said first indicating means located in the same plane; a second rotatable shaft connected to and positioned perpendicular to said foil; second sensing means connected to said second shaft and positioned adjacent to said second side of said foil; second indicating means connected to said first shaft and positioned adjacent to said second side of said foil; said second sensing means and said second indicating means located in the same plane; whereby the optimum angle of attack of said foil is indicated by parallel positioning of said first indicating means to said second sensing means, and parallel positioning of said second indicating means to said first sensing means.

2. Apparatus for indicating the optimum attack angle of a moving fluid foil as claimed in claim 1 wherein: said second shaft is mounted co-axially with said first shaft.

3. Apparatus for indicating the optimum attack angle of a moving fluid foil as claimed in claim 1 wherein: said first shaft, said first sensing means and said first indicating means comprise a first unitary assembly; said second shaft, said second sensing means and said second indicating means comprise a second unitary assembly; and there is further included first and second balancing means each connected respectively to said first and second unitary assemblies.

4. Apparatus for indicating the optimum attack angle of a moving fluid foil as claimed in claim 1 wherein: said first and second indicating means are each of a construction to present substantially less resistance to the flow of said fluid over said foil than said first and second sensing means respectively.

5. Apparatus for indicating the optimum attack angle of a moving fluid foil as claimed in claim 1 wherein: said first and second sensing means and said first and second indicating means each comprise a vane; each vane affixed at one end to said respective connected rotatable shafts.

6. Apparatus for indicating the optimum attack angle of a moving fluid foil as claimed in claim 5 wherein: said vanes comprising said first and second indicating means are substantially smaller in surface area than said vanes comprising said first and second sensing means.

7. Apparatus for indicating the optimum attack angle of a moving fluid foil as claimed in claim 1 wherein: there is further included support means connected to said foil and rotatably holding said first and second shafts perpendicular to said foil.

8. Apparatus for indicating the optimum attack angle of a moving fluid foil as claimed in claim 7 wherein: said support means include fastening means for securing said support means to said foil.

9. Apparatus for indicating the optimum attack angle of a moving fluid foil as claimed in claim 7 wherein: said support means include a rotative bearing; said first shaft mounted co-axially in said bearing.

10. Apparatus for indicating the optimum attack angle of a moving fluid foil as claimed in claim 9 wherein: said second shaft is mounted co-axially within said first shaft.

* * * * *